J. F. O'CONNOR.
FRICTION SHOCK ABSORBING MECHANISM.
APPLICATION FILED SEPT. 18, 1918.
1,308,099.
Patented July 1, 1919.
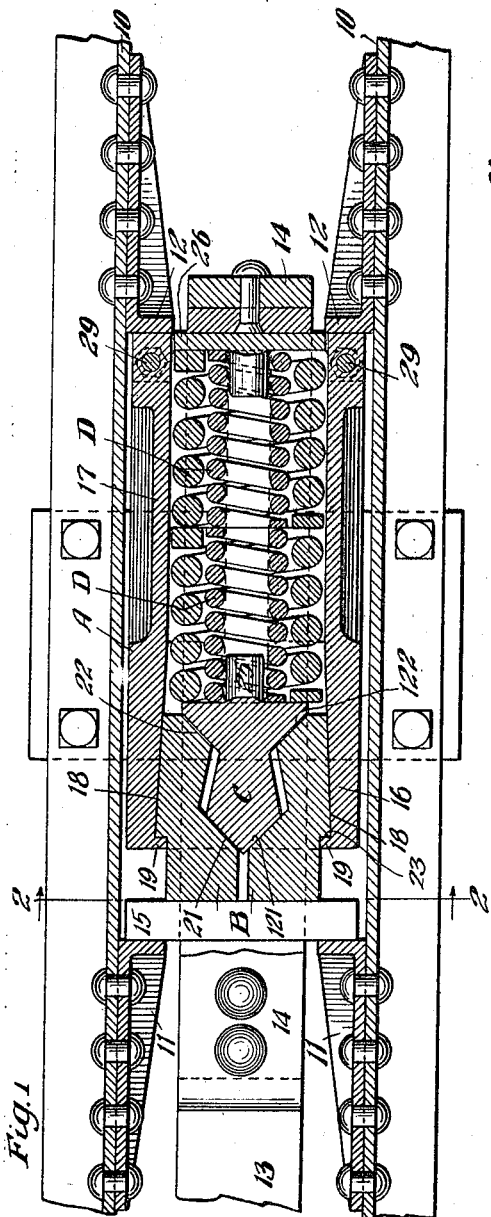
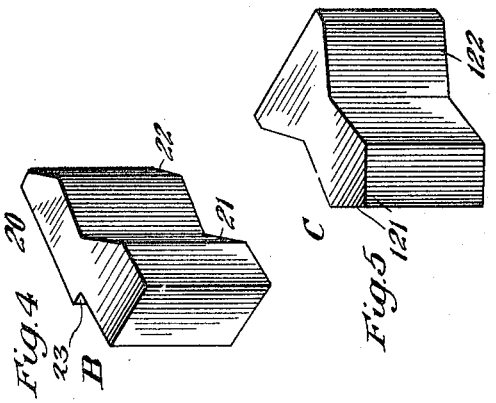
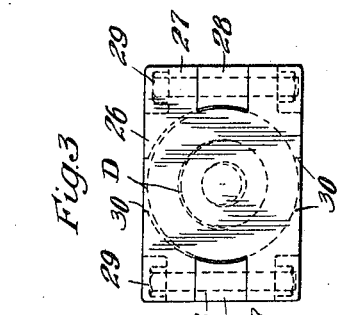
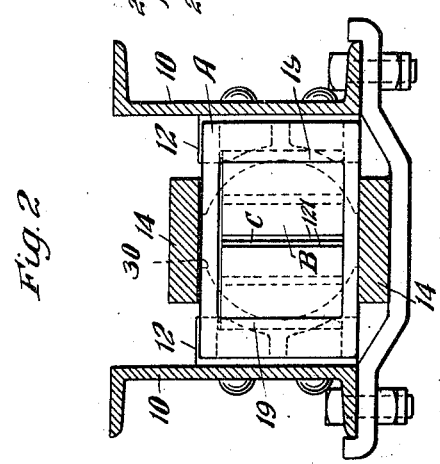
WITNESSES:
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,308,099.   Specification of Letters Patent.   Patented July 1, 1919.

Application filed September 18, 1918. Serial No. 254,574.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

In the gradual development of the railway draft rigging art, the constant tendency has been toward shock absorbing mechanisms of higher capacity than were formerly used. This is due primarily to the much heavier service encountered in the operation of railway cars, both in the weight of the cars handled, number of cars per train and faster switching service. The most common form of shock absorbing mechanism in general use up to the last few years has been the so-called tandem spring gear. A great many thousand of these tandem spring gears are still in service but are hardly adequate to the present day conditions. Said tandem spring gears are of considerably smaller size than even the spring gears of the present day service, the old tandem gears generally being adapted for 6¼" draw bar butts and the springs themselves being of the 6¼"x8" M. C. B. type.

In making the change from lighter to heavier shock absorbing mechanisms, it is, of course, extremely desirable to utilize as many of the old parts as possible so as to effect a saving in the cost of material for the railroads. Inasmuch as the springs alone cannot produce any greater capacity, the trend has been toward the use of friction gears.

The object of my invention is to provide a friction gear suitable for present day service and wherein are utilized as many of the parts of the old small tandem spring gears, as possible.

More specifically, the object of my invention is to provide a friction gear for railway draft riggings wherein the old draw bars, yoke straps, springs, and one follower of the tandem spring gears may be utilized.

In the drawings forming a part of this specification, Figure 1 is a horizontal, longitudinal, sectional view of a portion of a railway draft rigging showing my improvements in connection therewith. Fig. 2 is a vertical, transverse, sectional view, taken substantially on the line 2—2 of Fig. 1. Fig. 3 is an end elevational view of the rear of the shock absorbing mechanism proper. And Figs. 4 and 5 are detail perspective views of one of the friction shoes and wedges, respectively.

In said drawing, 10—10 denote channel-shaped center or draft sills as applied to a modern car underframe. Secured to the inner faces of said sills are the well known front and rear sets of stop lugs 11 and 12. The draw bar is indicated at 13, the same being of small size and having a butt of approximately 6¼". A corresponding old yoke strap 14 is shown riveted to the draw bar, the intermediate thimble of the tandem yoke being omitted in order to accommodate the friction gear which I have designed. The front follower 15 is also of the size used in the old tandem spring gears.

The improved shock absorbing mechanism proper, as shown, comprises a casting A, a pair of friction shoes B, a wedge C, and two springs D—D.

The casting A is formed with a friction shell proper 16 at its forward end and a spring casing 17 rearwardly thereof. The friction surfaces of the shell 16 are tapered inwardly, as indicated at 18 and inturned shoulders 19 are formed at the forward end of the friction shell.

Each of the friction shoes B is provided with an outer friction surface 20 coöperable with the friction surface of the shell. On its inner face, each shoe B is provided with a pair of parallel but separated wedge faces 21—22. The shoes B are extended forwardly or outwardly beyond the end of the friction shell so as to engage the follower 15 directly and in order to limit the outward movement of the shoes with respect to the shell, the shoes are provided with shoulders 23—23 coöperable with the shoulders 19 of the shell.

The wedge C is disposed within the shoes B and is formed with duplicate sets of parallel wedge faces 121 and 122 coöperable with the wedge faces 21 and 22, respectively, of the shoes. At its inner end, the wedge C is formed with a short lug 25 on which is adapted to be centered the forward end of the front spring D.

The springs D consist of two coils each and the same are similar to those employed in the old tandem spring gears, that is, each of the springs D is of the M. C. B. type 6¼"x8", and they are arranged end to end.

In order to insert the friction shoes, wedge and springs, the rear end of the combined shell and spring casing is made detachable, as indicated at 26, and said end 26 and the casting proper A are provided with overlapped perforated ears 27 and 28 through which are extended connecting bolts 29—29.

The casting A is made quite narrow in a vertical direction and is substantially of the same height as the diameter of the springs D, the casting A being cut away somewhat, as indicated at 30—30 for this purpose. In this manner, the casting A may be included between the arms of the old yoke straps and thereby permit the reëmployment of said straps without material change.

It is evident that the over-all length of the friction mechanism will equal the sum of the lengths of the two springs and three followers of the tandem spring gear plus the width of the usual thimble of the tandem yoke.

With the construction above described, it is evident that I am enabled to reëmploy many of the parts of the old tandem spring gears without modification and with consequent material saving to the railroads. At the same time, I obtain a mechanism which has much greater shock absorbing capacity than the springs themselves.

I claim:

In a friction draft rigging for railway cars, the combination with a standard draw bar and a yoke strap having a single pocket, both the yoke strap and draw bar being of relatively small size, the yoke corresponding in length and height to a yoke for a tandem spring gear employing springs of relatively small diameter; of a relatively narrow follower within the yoke; and a friction shock absorbing mechanism also mounted within the yoke, the over-all length of said friction mechanism substantially equaling the sum of the length of two springs, the thickness of three followers and the width of a yoke thimble of a tandem spring gear such as said yoke corresponds to in length and height, said friction mechanism including a shell substantially equal in height to the vertical space between the yoke arms, friction elements, and spring elements having an over-all length substantially equal to the combined length of two springs of a tandem spring gear, the diameter of said spring elements substantially equaling the space between the arms of the yoke.

In witness that I claim the foregoing I have hereunto subscribed my name this 29th day of Aug. 1918.

JOHN F. O'CONNOR.